(12) United States Patent
Al-Dhahir et al.

(10) Patent No.: US 7,450,656 B1
(45) Date of Patent: Nov. 11, 2008

(54) METHOD FOR COMMUNICATING VIA A CHANNEL CHARACTERIZED BY PARAMETERS THAT VARY IN TIME WITHIN A TRANSMISSION BLOCK

(75) Inventors: Naofal Al-Dhahir, Morris Township, Morris County, NJ (US); Suhas N. Diggavi, New Providence, NJ (US); Anastasios Stamoulis, New Providence, NJ (US)

(73) Assignee: AT&T Corp., Bedminster, NJ (US)

( * ) Notice: Subject to any disclaimer, the term of this patent is extended or adjusted under 35 U.S.C. 154(b) by 43 days.

(21) Appl. No.: 11/490,973

(22) Filed: Jul. 21, 2006

Related U.S. Application Data

(63) Continuation of application No. 10/152,609, filed on May 21, 2002, now Pat. No. 7,173,975.

(60) Provisional application No. 60/307,759, filed on Jul. 25, 2001.

(51) Int. Cl.
*H04B 7/02* (2006.01)
*H04L 1/02* (2006.01)

(52) U.S. Cl. .................. 375/267; 375/299; 375/347; 375/146; 375/147; 375/295; 375/316

(58) Field of Classification Search .............. 375/267, 375/299, 347, 146, 147, 295, 316
See application file for complete search history.

(56) References Cited

U.S. PATENT DOCUMENTS

| 6,473,393 | B1 * | 10/2002 | Ariyavisitakul et al. | 370/203 |
| 6,952,454 | B1 * | 10/2005 | Jalali et al. | 375/260 |
| 2002/0041635 | A1 * | 4/2002 | Ma et al. | 375/267 |
| 2004/0095907 | A1 * | 5/2004 | Agee et al. | 370/334 |

* cited by examiner

*Primary Examiner*—David C. Payne
*Assistant Examiner*—Nader Bolourchi

(57) ABSTRACT

In an environment where a block transmission takes place via a frequency selective channel that is characterized by channel parameters that change with time in the course of the transmission of a block, an arrangement employs pilot signals to ascertain some of the parameters, and estimates the remaining parameters through an interpolation process. In some embodiments, channel coefficients estimates are improved by employing estimates from previous blocks. In an OFDM system, the pilot signals are advantageously selected to be in clusters that are equally spaced from each other in the time or the frequency domains. This approach applies to multiple antennae arrangements, as well as to single antenna arrangements, and to arrangements that do, or do not, use space-time coding.

11 Claims, 3 Drawing Sheets

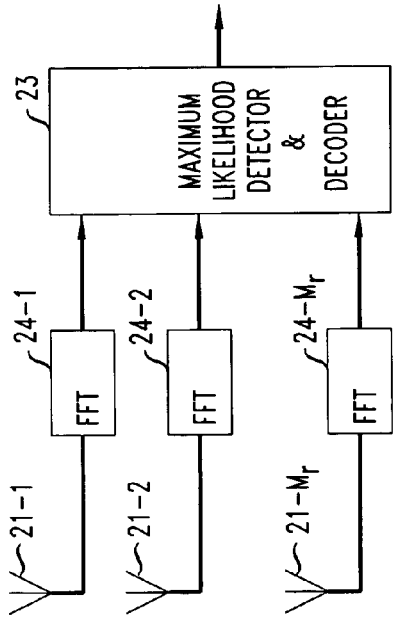
FIG. 3
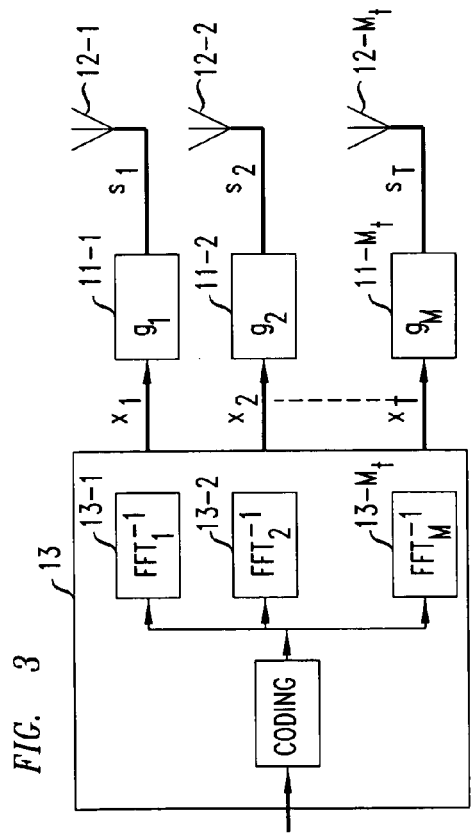
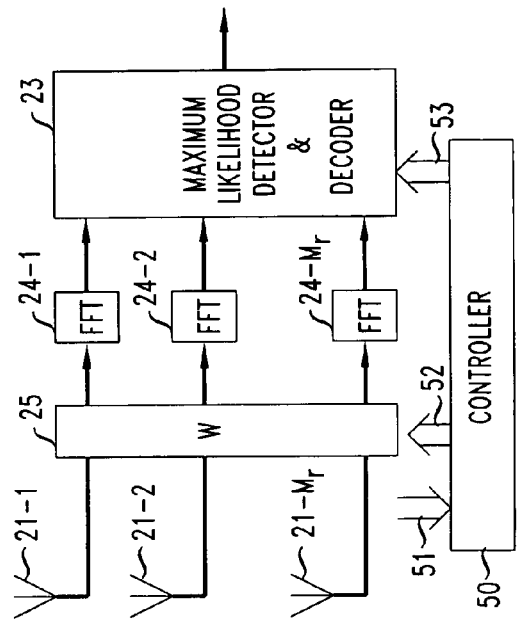
FIG. 4
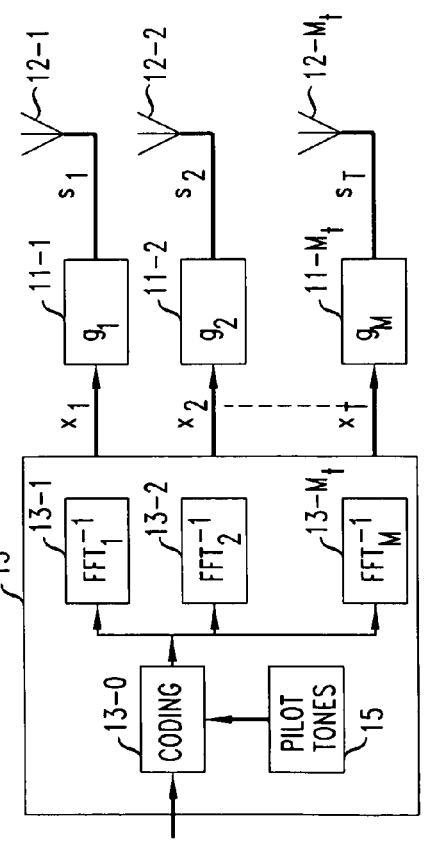

METHOD FOR COMMUNICATING VIA A CHANNEL CHARACTERIZED BY PARAMETERS THAT VARY IN TIME WITHIN A TRANSMISSION BLOCK

RELATED APPLICATIONS

This is a continuation of U.S. patent application Ser. No. 10/152,609, filed May 21, 2002 now U.S. Pat. No. 7,173,975, which claims priority from Provisional Application No. 60/307,759, filed Jul. 25, 2001.

BACKGROUND OF THE INVENTION

This invention relates to wireless communication and, more particularly, to wireless communication in an environment where transmission channel characteristics change relatively rapidly.

The explosive growth of wireless communications is creating a demand for high-speed, reliable, and spectrally efficient communications. There are several challenges to overcome in attempting to satisfy this growing demand, and one of them relates to the time variations in the transmission of multicarrier-modulated signals.

Multicarrier transmission for wireless channels has been well studied. The main advantage of orthogonal frequency division multiplexing (OFDM) transmission stems from the fact that the Fourier basis forms an eigenbasis for time-invariant channels. This simplifies the receiver, which leads to an inexpensive hardware implementations, since the equalizer is just a single-tap filter in the frequency domain—as long as the channel is time invariant within a transmission block. Combined with multiple antennas, OFDM arrangements are attractive for high data rate wireless communication, as shown, for example, in U.S. application Ser. No. 09/213,585, filed 17 Dec. 1998.

Time invariability within a transmission block cannot be guaranteed at all times, for example, with the receiving unit moves at a high speed, and that leads to impairments because the Fourier basis at such times no longer forms the eigenbasis, and the loss of orthogonality at the receiver results in intercarrier interference (ICI). Depending on the Doppler spread in the channel, and the block length, ICI can potentially cause severe deterioration of quality of service

SUMMARY

In an environment where a block transmission takes place via a frequency selective channel that is characterized by channel parameters that change with time in the course of the transmission of a block, an advance in the art is realized by employing pilot signals to ascertain some of the parameters and by estimating the remaining parameters through an interpolation process. More specifically, in the aforementioned environment, the number of channel parameters that potentially can change in value from one block to the next is such that pilot signals cannot be used to ascertain the values of the channel parameters. In accordance with the principles disclosed herein, a number of pilot signals can be used that number is less than the number of pilot signals that are required for estimation of parameters. The channel coefficients are determined through judicious selection of the pilot signals that are used, coupled with an interpolation process. In some embodiments, channel coefficients estimates are improved by employing estimates from previous blocks.

In an OFDM system, the pilot signals are advantageously selected to be in clusters that are equally spaced from each other in the time or the frequency domains. This approach applies to multiple antennae arrangements, as well as to single antenna arrangements, and to arrangements that do, or do not, use space-time coding.

BRIEF DESCRIPTION OF THE DRAWINGS

FIG. 3 presents a block diagram of a prior art OFDM arrangement with a multi-antenna transmitter and a multi-antenna receiver;

FIG. 4 presents a block diagram of an OFDM arrangement with a multi-antenna transmitter and a multi-antenna receiver in accord with principles of this invention.

DETAILED DESCRIPTION

Figure 1:
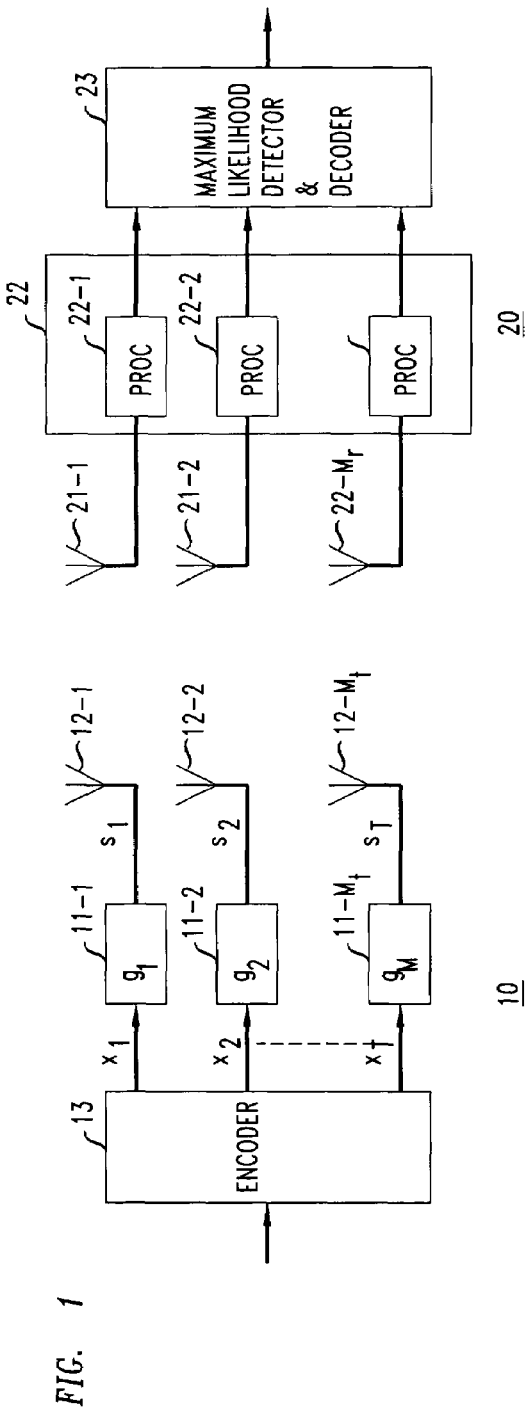
FIG. 1 presents a block diagram of a prior art arrangement with a multi-antenna transmitter and a multi-antenna receiver.

FIG. 1 presents a general block diagram of a wireless arrangement where a transmitter 10 includes $M_t$ transmitting antennas 12-1, 12-2, . . . 12-$M_t$, each of which transmits a signal $s_i$ that is obtained by processing input signal $x_i$ through a processing unit $g_i$, shown by units 11-1, 11-2 and 11-$M_t$. It is assumed that the channel's impulse response function is time-varying. A receiver 20 includes $M_r$ receiving antennas 21-2, 21-2, . . . 21-$M_r$, and the received signals are applied to processing unit 22.

When considering only a single transmitting antenna and a single receiving antenna, the received signal y, at time t, can be expressed by $$y(t) = \int b(t,\tau) s(t-\tau) d\tau + z(t) \qquad (1)$$

where $b(t, \tau)$ is the impulse response of the time-varying channel between the transmitting antenna and the receiving antenna, as a function of $\tau$, at time t, and $s(t-\tau)$ is the transmitted signal at time $t-\tau$. When sampled at a sufficiently high rate (above $2W_t + 2W_s$, where $W_t$ is the input bandwidth and $W_s$ is the bandwidth of the channel's time variation), equation (1) can be written in discrete form; and when the transmission channel between the transmitting antenna and the receiving antenna is represented by a discrete, finite, impulse response corresponding, for example, to a tapped filter having v samples of memory, then equation (1) can be expressed as $$y(k) = y(k\tau_s) = \sum_{l=0}^{v} h(k,l) x(k-l) + z(k) \qquad (2)$$

where y(k) and z(k) are the received signal and the received noise at sample time k, h(k,l) represents the sampled (time-varying) channel impulse response that combines the transmit filter $g_i$ with the channel response $b_i$, and x(k−l) is the input signal at sample time k−l.

When there are $M_r$ receiving antennas, and $M_t$ transmitting antennas, equation (2) generalizes to $$y(k) = \sum_{l=0}^{v} H(k,l)x(k-l) + z(k) \quad (3)$$

where $y(k)$ is an $M_r$-element vector corresponding to the signals received at the receiving antennas (31, 32, 33) at sample time k, $H(k,l)$ is an $M_r$ by $M_t$ matrix of the $l^{th}$ tap of the transmission medium filter at sample time k (k is a parameter because the transmission medium varies with time), $x(k-l)$ is an $M_t$-element input vector at sample time k−l that corresponds to the signals of transmitting antennas 21, 22, 23, and $z(k)$ is the $M_r$-element noise vector at sample time k.

Figure 2:
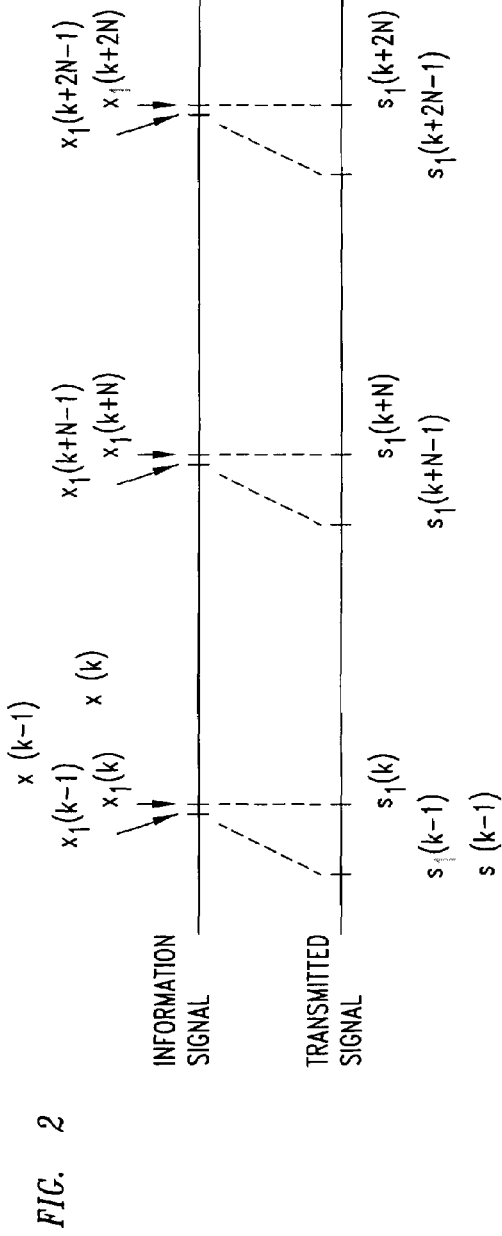
FIG. 2 shows a signal arrangement where transmitted symbol blocks are augmented with a prefix code that is used to remove inter-block interference.
Figure 5:
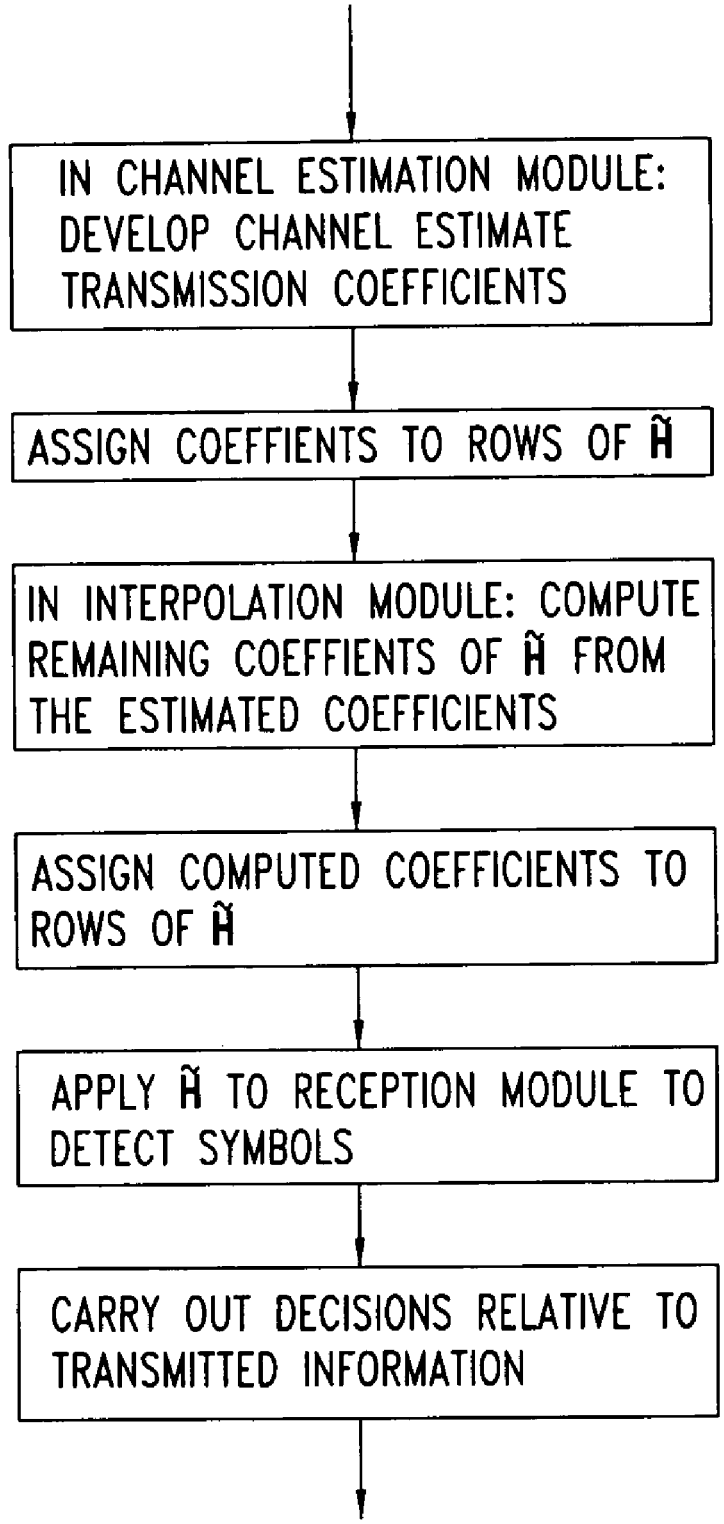
FIG. 5 presents a flow diagram of the method carried out in a receiver that employs interpolation to obtain channel attribute estimates.

When considering the transmission of information from transmitter 10 to receiver 20 in blocks, one has to realize that the memory/delay of the transmission medium will cause interference between one block and the next, unless a guard-time interval is provided that corresponds to at least the delay introduced by the transmission medium. One can simply send no signals during this interval, but one can also send a symbol sequence, of any length greater than the memory/delay of the transmission medium, i.e., v or more symbols. Thus, one can send a block of N symbols from antenna 12-1 with a prefix of v symbols, as shown in FIG. 2, for example, and a receiving antenna can ignore the first v receiving signals—because those first v signals suffer from interference by the previous block—and focus on only the remaining N received signals. This can be expressed for one transmitting antenna and one receiving antenna, by the equation $$y = Hx + z \quad (4)$$

where y is a vector with elements $y(k), y(k+1), \ldots y(k+N-1)$, x is a vector with elements $x(k-v), x(k-v+1), \ldots x(k-1), x(k), x(k+1) \ldots x(k+N-1)$, and H is a N by N+v element matrix (channel coefficients between the transmitting antenna and the receiving antenna during the N symbol intervals when the receiving antenna pays attention to the signal). When the prefix is selected so that $$x(-v+i) = x(N-1+i) \text{ for } i=1, 2, \ldots v-1, \quad (5)$$

then the x vector reduces to an N element vector, and H reduces to a N by N element matrix.

When the full complement of $M_t$ transmitting antennas and $M_r$ receiving antennas are considered, equation (4) holds, but H becomes an $N \cdot M_r$ by $N \cdot M_t$ matrix, y and z become $N \cdot M_r$-element vectors, and x becomes an $N \cdot M_t$-element vector.

It may be noted that there is no loss of generality in assuming that $M_t = M_r = M$, which makes H a square matrix of size NM. In the treatment below, therefore, this assumption is made, but it should be understood that the principles disclosed herein apply to situations where $M_t$ is not necessarily equal to $M_r$.

At a particular receiving antenna, for example 21-$j$, the received signal can be expressed by equation (4) where H is an N by NM matrix. H can also be considered as an M element vector, where each element is an N by N matrix of $H_{ij}$ of transfer coefficients between transmitting antenna i and receiving antenna j, i.e., vector $[H_{1j}, H_{2j}, \ldots H_{Mj}]$.

In an OFDM system like the one shown in FIG. 3, each block of N signals in sequence $x_i$ is generated by block 13-$i$, which performs the inverse discrete Fourier transform (IDFT) of an information-bearing signal X, i.e., $$x = Q^H X, \quad (6)$$

which in the case of an arrangement where there are M transmitting antennas and M receiving antennas, $Q^H$ is the Hermitian of Q, and Q is an NM by NM matrix with elements $\tilde{Q}$ on the diagonal, and 0s elsewhere, where $\tilde{Q}$ is the N-point DFT transform matrix $$\tilde{Q}(l,k) = \frac{1}{\sqrt{N}} e^{-j\frac{2\pi}{N}lk} \text{ for } 0 \leq l, k \leq N-1. \quad (7)$$

In the case of a single transmitting antenna and a single receiving antenna, equation (6) is simply $x = \tilde{Q}^H X$.

At the receiver, the signal of each antenna 21-$j$ is applied to element 24-$j$, which performs a N-point DFT, generating an N-element vector $Y_j$. This can be expressed by $$Y_j = \tilde{Q}\left(\sum_{i=1}^{M} H_{ij} \tilde{Q}^H X_i + z\right). \quad (8)$$

where $H_{ij}$ is the N by N matrix of coefficients between transmitting antenna i and receiving antenna j, and $X_i$ is an N-element vector applied to inverse FFT element 13-$i$ (advantageously, N is a power of 2 integer). The signal at the output of element 24-$i$ at clock interval p (within a block) can be written as $$Y_j(p) = \sum_{l=1}^{M} \left(\sum_{q=1}^{N} G_{lj}(p,q) X_l(q)\right) + Z(p) \quad (9)$$

where $Z(p)$ is the transformed noise at clock interval p, $X_l(q)$ is the signal at clock interval q of the block applied to inverse FFT element 13-$l$, and $G_{lj}(p,q)$ is the $(p,q)^{th}$ element of matrix $$G_{lj} = \tilde{Q} H_{lj} \tilde{Q}^H. \quad (10)$$

Equation (9) can also be written as $$Y_j(p) = \sum_{l=1}^{M} \left( G_{lj}(p,p) + \sum_{\substack{q=1 \\ q \neq p}}^{N} G_{lj}(p,q) X_l(q) \right) + Z(p), \quad (11)$$

and generalizing to the multiple receiving antenna case, equation (11) can be expressed by $$Y(p) = G(p,p) + \sum_{\substack{q=1 \\ q \neq p}}^{N} G_j(p,q) X(q) + Z(p) \quad (12)$$

$$= G(p,p) + Z_{ICI}(p) + Z(p).$$

When the transmission medium coefficients do not vary with time, matrix H of equation (4) becomes a circulant matrix, and it can be shown that when H is circulant, $QHQ^H$ is a diagonal matrix. However, when H does vary with time, $QHQ^H$ is no longer a diagonal matrix, and consequently, signal $Z_{ICI}(p)$ of equation (12) is non-zero. Stated in other words, when the transmission coefficients do vary with time, the received signal contains inter-carrier interference. If the $Z_{ICI}(p)$ were to be eliminated, however, then a conventional decision circuit can be used to arrive at the N elements of Y(p) that form the received block of information signals. Obviously, therefore, it is desirable to eliminate—the inter-carrier interference signals, but in order to do that one must know the values of all of the coefficients of matrix H.

In the time span of N symbol intervals, i.e., in a block, it is possible for each coefficient to change with each sample interval. The matrix $H_{ij}$ between any transmitting antenna i and any receiving antenna j (in the time span of a block) in an N by N matrix (as demonstrated by above), but only v terms in each row are non-zero. Consequently, only Nv coefficients need to be ascertained for each H matrix between a transmitting antenna and a receiving antenna (rather than $N^2$ coefficients). Nevertheless, this number is still much too large to ascertain, because only N signals are transmitted in a block and, therefore, it is not possible to estimate Nv coefficients, even if all N sample intervals in a block were devoted to known (pilot) signals—which, of course, one would not want to do because it would leave no capacity for communicating any information.

The disclosure below presents a novel approach for developing the necessary coefficients of $H_{ij}$, but alas, some of those coefficients are likely to be inexact. Consequently, one can only reduce the inter-carrier interference to some minimum level, rather than completely eliminate it. Still, while recognizing that the channel coefficients that are available in receiver 20 are not all totally accurate, in the treatment below it is assumed that all coefficients of matrix $H_{ij}$ are known.

To reduce this inter-carrier interference in accord with the principles disclosed herein, a filter element 25 with transfer function W is interposed between the receiving antennas and the FFT elements 24-j (where index j ranges from 1 to $M_r$), as shown in the FIG. 4 embodiment. The signal developed at the outputs of the FFT elements is $$Y = QWHQ^H X + QWz = \overline{G}X + \overline{Z}, \quad (13)$$

where Q, W, and H are NM by NM matrices, and X and z are NM-element vectors. Defining $e_m$ as an NM-element vector with a 1 in the $m^{th}$ element and zeros elsewhere, then vector $q_m = Q^H e_m$ represents the $m^{th}$ column of matrix $Q^H$, which is an NM element vector, comprising M concatenated sets of values $$\frac{1}{\sqrt{N}} e^{j\frac{2\pi}{N} mk}$$

for $0 \leq k \leq N-1$.

Defining $h_m = Hq_m$, $w_m = W^H q_m$, and $R_m = HH^H - h_m h_m^H$, and further, assuming that $w_m^H w_m = 1$ for $0 \leq m \leq N-1$, it can be shown that the optimum vector at symbol interval m, (i.e., for frequency bin m), $w_m$, is one that results from solving the optimization problem $$\max_m w_m^H h_m h_m^H w_m \text{ subject to } w_m^H \left( \frac{1}{SNR} I + R_m \right) w_m = 1 \text{ and} \quad (14)$$

-continued
$$w_m^H w_m = 1.$$

It can be shown that by defining $$R_{yy} = \frac{1}{SNR} I + HH^H$$

and computing the inverse matrix $R_{yy}^{-1}$, the optimum vector for frequency bin m is $$w_{m,optimum} = \frac{R_{yy}^{-1} h_m}{|R_{yy}^{-1} h_m|}. \quad (15)$$

Repeating the computations leading to equation 15 for all values of m=0,1, ... NM yields the various vectors that correspond to the columns of matrix $W^H Q^H$, by definitions of the relationships $w_m = W^H q_m$ and $q_m = Q^H e_m$. Forming the matrix, post-multiplying it by Q and taking the Hermitian of the result yields the matrix W.

In the FIG. 4 arrangement, controller 50 is responsive to all of the signals acquired by antennas 21-j (via bus 51), computing the values of the channel coefficients (elements of H), and also computing the coefficients of matrix W as disclosed above. The coefficients of W are applied to filter 25, and the coefficients of H are applied to detection element 23. Computation of channel coefficients from received pilot signals is well known in the art. An innovative approach for estimating channel coefficients in an OFDM system is disclosed, for example, in a patent application by Ariyavisitakul et al, titled "Channel Estimation for OFDM Systems with Transmitter Diversity" which was field on Dec. 18, 1998 and bears the Ser. No. 09/215,074. This application is incorporated by reference herein. In the work by Ariyavistakul et al the channels do not vary within an OFDM block.

As indicated above, computation of the optimum filter that is placed following each antenna requires knowledge of the channel coefficients. The following discloses a method and corresponding apparatus that ascertains a selected number of coefficients of H through the use of pilot signals, and obtains the remaining coefficients of H through interpolation. For sake of simplicity of the mathematical treatment, it is assumed that M=1 because the generality of the treatment is not diminished by this assumption. Also, in accord with the principles disclosed herein, it is assumed that the H matrix coefficients in the course of transmitting a number of adjacent symbols within a block do not vary significantly and that, therefore, if two rows of coefficients of matrix H that are fairly close to each other are known, then the coefficient rows between them can be obtained through linear interpolation of the known rows.

A row of coefficients effectively defines the channel at the clock interval corresponding to the row, and in the treatment below it is designated by h(n,l), where index n corresponds to the row with matrix H (i.e., an integer between 1 and N, inclusively) and index l corresponds to the v potentially non-zero coefficients on a row of H.

Extending this thought, if the channel coefficients are known at P clock intervals, where P is any selected number, i.e., if P rows of H are known, then the remaining rows of H can be obtained by interpolation of the P known rows. Intuitively it is apparent that the error in estimating the coefficients of H decreases as the value of P is increased (i.e., more rows of H are known). Stating the interpolation mathematically, generally, a row h(n,l) can be obtained from $$h(n, l) = \sum_{i=1}^{P} a_n^i h(m_i, l) \qquad (17)$$

where coefficients $a_n^i$ are members of a set of coefficients $a_n$ and $h(m_i,l)$ is the $i^{th}$ known set of channel coefficients. In vector notation, $$h(n,l) = a_n \mathcal{P} \qquad (18)$$

where $\mathcal{P}$ is a P-element vector $\mathcal{P} = [h(m_1,l) h(m_2,l) \ldots h(m_P,l)]^T$, and $a_n$ is a vector with elements $a_n^i$. If $H_c(i)$ designates the N by N H matrix if it were not time variant and had the coefficients of the $i^{th}$ channel that is known, i.e., channel h(m,l), then, the channel estimate, H, can be expressed by $$\tilde{H} = \sum_{i=1}^{P} A_{m(i)} H_c(m_i) \qquad (19)$$

where $A_i$ is an N by N diagonal matrix with elements $[A_{m(i)}]_{m,n}$ that is equal to 1 when n corresponds to the known channel h(m,l), i.e., when n equals m(i), is equal to 0 when n corresponds to the other P−1 known channels, and is equal to $a_n^i$ otherwise.

To illustrate, suppose N=5, and rows 1, 3 and 5 of H are known through detection of pilot signals at that are sent during clock intervals 1, 3 and 5. That is, index i has values 1, 3 and 3, and m(i) has values 1, 3 and 5. From the known rows we can then construct $H_c(m_1)$ from $h(1,l)$, $H_c(m_2)$ from $h(3,l)$ and $H_c(m_3)$ from $h(5,l)$. For the two missing rows, we have vector $a_2$ that has three elements, $a_2^1$, $a_2^2$, $a_2^3$, for example [0.2, 0.3, 0.5] and vector $a_4$ that has three elements, for example, [0.1, 0.2, 0.7]. According to the above, $$A_1 = \begin{bmatrix} 1 & 0 & 0 & 0 & 0 \\ 0 & a_2^1 & 0 & 0 & 0 \\ 0 & 0 & 0 & 0 & 0 \\ 0 & 0 & 0 & a_4^1 & 0 \\ 0 & 0 & 0 & 0 & 0 \end{bmatrix} = \begin{bmatrix} 1 & 0 & 0 & 0 & 0 \\ 0 & 0.2 & 0 & 0 & 0 \\ 0 & 0 & 0 & 0 & 0 \\ 0 & 0 & 0 & 0.1 & 0 \\ 0 & 0 & 0 & 0 & 0 \end{bmatrix}, \qquad (20)$$

$$A_3 = \begin{bmatrix} 0 & 0 & 0 & 0 & 0 \\ 0 & a_2^2 & 0 & 0 & 0 \\ 0 & 0 & 1 & 0 & 0 \\ 0 & 0 & 0 & a_4^2 & 0 \\ 0 & 0 & 0 & 0 & 0 \end{bmatrix} = \begin{bmatrix} 0 & 0 & 0 & 0 & 0 \\ 0 & 0.3 & 0 & 0 & 0 \\ 0 & 0 & 1 & 0 & 0 \\ 0 & 0 & 0 & 0.3 & 0 \\ 0 & 0 & 0 & 0 & 0 \end{bmatrix}, \text{ and} \qquad (21)$$

$$A_5 = \begin{bmatrix} 0 & 0 & 0 & 0 & 0 \\ 0 & a_2^3 & 0 & 0 & 0 \\ 0 & 0 & 0 & 0 & 0 \\ 0 & 0 & 0 & a_4^3 & 0 \\ 0 & 0 & 0 & 0 & 1 \end{bmatrix} = \begin{bmatrix} 0 & 0 & 0 & 0 & 0 \\ 0 & 0.5 & 0 & 0 & 0 \\ 0 & 0 & 0 & 0 & 0 \\ 0 & 0 & 0 & 0.7 & 0 \\ 0 & 0 & 0 & 0 & 1 \end{bmatrix}, \qquad (22)$$

and $$\tilde{H} = A_1 H_c(1) + A_3 H_c(3) + A_5 H_c(5). \qquad (23)$$

Two remaining considerations are the placement of the pilot tones, and the values employed in the $a_n$ vectors, for n=1, 2, . . . ,P.

It can be shown that for time-selective channels, pilot tones should be grouped together. On the other hand, in frequency selective time-invariant channels, placing the pilot tones equally spaced on the FFT grid is the optimal scheme. Therefore, for purposes of the FIG. 4 arrangement, it is advantageous to partition the pilot tones into equally spaced groups on the FFT grid. The pilot tones are generated in element 15 of FIG. 4, and are applied to coding unit 13-0, to be applied to elements 13-j as disclosed above. Of course, in the frequency bins where pilot tones are placed (or time intervals where pilot tones are placed), no information that is to be communicated can be sent.

As for the values employed in the $a_n$ vectors, without imposing any assumptions or the underlying channel variations, linear interpolation appears to be the simplest method for choosing the weight vectors. On the other hand, if a priori knowledge about the underlying channel model is available, more sophisticated channel interpolation schemes can be devised.

In the case of the linear interpolation, each $a_n$ vector consists of two non-zero terms that correspond to the two closest known rows of H (one on either side), and the values of the two non-zero terms reflect the relative distance of the row corresponding to n to the two known rows. For example, if H contains 48 rows and rows 1, 2, 3, 16, 17, 18, 31, 32, 33, 46, 47 and 48 are known, the $a_4$ vector is $\{0, 0, 12/13, 1/13, 0, 0, 0, 0, 0, 0, 0, 0\}$ To give an example of a situation where a priori knowledge about the channel is available assume, for example that the channels follow the Jakes model (see W. C. Jakes, *Microwave Mobile Communications*, John Wiley & Sons, Inc. 1994) where $E[(h(m,l) h^H(n,l)] = J_0(2\pi f_d(m-n)T)$ with $f_d$ denoting the Doppler frequency, and T denoting the symbol period, then the calculation of the interpolation weights is straightforward. For example if we fix rows $h_1$, $h_{N/2}$, $h_N$, the set of weights $a_n = [a_n(1), a_n(N/2), a_n(N)]$ that minimizes $E[|h(n,l) - a_n^H \tilde{h}(l)|^2]$ where $\tilde{h}(l) = [h(1,l), h(N/2,l), h(N,l)]^T$ can be obtained using the orthogonality principle $$a_n^H = R_{h_n \tilde{h}} R_{\tilde{h}\tilde{h}}^{-1}$$

where $$R_{h_n \tilde{h}} = [J_0[1-n], J_0[N/2-n], J_0[N-n]] \qquad (24)$$

and $$R_{\tilde{h}\tilde{h}} = \begin{bmatrix} 1 & J_0[N/2-1] & J_0[N] \\ J_0[N/2-1] & 1 & J_0[N/2] \\ J_0[N] & J_0[N/2] & 1 \end{bmatrix} \qquad (25)$$

with $J_0(n)$ being equal to $J_0(2\pi f_d nT)$. Typically, however, for Doppler values of practical importance, there is little to be gained by adopting the Jakes-based estimator in place of the linear interpolator. Hence, from an implementation point of view, the linear estimator appears to be an attractive solution, as it dispenses with the estimation of the Doppler frequency, without sacrificing performance.

An additional enhancement is achieved through channel tracking. In channel tracking, it is assumed that matrix H of one block is related to matrix H of the previous blocks and, therefore, given a matrix $\hat{H}_{u-1}$ that is used during block u−1, and an estimate of the H matrix derived from the pilot signals for block u, $H_u$, a matrix to be employed during block 1 is obtained from $$\hat{H}_u = \alpha \tilde{H}_u + (1+\alpha)\hat{H}_{u-1} \qquad (26)$$

where α is a preselected constant less than 1.

It should be noted that the above-disclosed approach could be used in conjunction with any coding technique in coder 13-0 of FIG. 4, including space-time coding as described, for example, in U.S. Pat. No. 6,185,258.

It should also be realized that the receiver embodiment shown in FIG. 4 intends to clearly demonstrate the signal flow in the receiver and that the actual, physical, embodiment will likely have a somewhat different block diagram. Specifically, the coefficients of W for block u of the received signals (the block being the $M_r$ received signals during N symbol intervals) need to be developed from the coefficients of the channel transmission matrix, as best estimated by processor 50. In some applications, as disclosed above, this matrix is $\hat{H}_u$, which is developed pursuant to equation (26). Equation (26) needs to have access to $\hat{H}_{u-1}$ and to $\tilde{H}_u$. The former implies a memory within controller 50, and the latter implies access to the received signals of block u and processing time that is necessary to develop $\tilde{H}_u$. To obtain this processing time, filter W (or an element between antennas 21-$j$ and the filter W might advantageously include memory that can store at least one block's work of received signals. In an embodiment where the functions of controller 50, filter 25, FFT elements 24-$j$, and detector & decoder element 23 are implemented with a stored program controlled processor, more than one block's work of memory is needed, though the precise amount is dependent of the specific code that the artisan will write to implement to method disclosed herein.

The invention claimed is:

1. A method, executed in a transmitter that has an $M_t$ plurality of antennas, where $M_t$ is an integer greater than zero, a coding element that is responsive to an applied segment of N symbols and creates a block of N+v symbols that are applied to each of said $M_t$ antennas, where v is equal to or greater than number of symbol intervals that a transmission medium through which said $M_t$ antennas transmit can effectively store, a coupling means between the coding element and the antennas, and a generator for developing pilot signals that are coupled to said antennas, comprising the steps of:

said generator developing clusters of said signals with a sum of the signals in the clusters being less N, with said signals selected to result in clusters of pilot signals being transmitted by said $M_t$ antennas, where each of the clusters contains two or more of said pilot signals appearing in adjacent ones of said symbol intervals within said segment of N symbol intervals, and said clusters being essentially equally spaced throughout said N symbol intervals.

2. The method of claim 1 further comprising the step of distributing said blocks of N+v symbols to t inverse Fast Fourier Transform elements, the output signals of each of which are coupled to an associated one of said t antenna, thus having each antenna transmit symbols at time intervals, and at each time interval transmit symbols at each of a set of frequency bins.

3. The method of claim 2 where said v symbols are derived from said N symbols.

4. The method of claim 2 wherein said pilot signals are also transmitted in equally spaced groups along the set of frequency bins.

5. A method, executed in a receiver that includes a reception module including $M_r$ antennas for acquiring a block of $M_r$ input signals in each of N symbols intervals, where each input signal is a sum of $M_t$ input signals from a transmitter, received at said receiver after passing through a channel having a memory of v symbols intervals, where $M_r$, and $M_t$ are integers greater than zero and v is an integer greater than 1, which channel is characterized by signal transmission coefficients that vary from each of said symbol intervals to a next of said symbol intervals, said channel expressible by a matrix H where a row of said matrix comprises signal transmission coefficients of said channel as experienced by one of said $M_r$ input signals at one of said N symbol intervals, and a next row of said matrix comprises signal transmission coefficients of said channel as experienced by said one of said $M_r$ input signals at a next one of said N symbol intervals, comprising the steps of:

developing, in a channel estimation module, responsive to said $M_r$ input signals received at said N symbol intervals that, based on preselected pilot signals received and detected during A of said N symbols intervals, A being an integer, estimates said channel transmission coefficients;

assigning the developed estimates to corresponding A rows of said matrix Ḣ, matrix Ḣ being an estimate of matrix H;

computing, in an interpolation module, remaining rows of said matrix Ḣ from at least some of said A rows of said matrix Ḣ;

assigning the computed estimates to corresponding A rows of said matrix Ḣ, m; and carrying out decisions relative to transmitted information by using said matrix Ḣ.

6. The method of claim 5 further comprising the step of said interpolation module applying coefficients of matrix Ḣ to said reception module to enable said reception module to detect information symbols contained in said $M_r$ input signals received at said N symbol intervals.

7. The method of claim 5 where said interpolation module computes a row n of coefficients of said matrix Ḣ, where 1<n<N by linearly interpolating between a first row of said matrix Ḣ, j, with coefficients determined from detection of pilot signals, that is closest to n but smaller than n, and a second row of said matrix Ḣ, k, with coefficients determined from detection of pilot signals, that is closest to n but larger than n.

8. The method of claim 5 where said interpolation module computes said each of said remaining rows of said matrix Ḣ from more than two of said A rows.

9. The method of claim 5 where said interpolation module employs a priori knowledge about characteristics of said transmission channel.

10. The receiver of claim 5 where said interpolation module employs linear interpolation.

11. The method of claim 5 where said interpolation module develops a new matrix Ḣ with each successive block of N symbol intervals, Ḣ, for each developed Ḣ, creates coefficients matrix $\hat{H}_r = \alpha \hat{H}_{r-1}(1-\alpha)\dot{H}_r$, where α is a selected constant less than 1, stores matrix $\hat{H}_r$, applied $\hat{H}_r$ to said reception module to enable said reception module to detect information symbols contained in said $M_r$ input signals received at said N symbol intervals, and advances integer index r by 1.

* * * * *